United States Patent
Van De Ven (10) Patent No.: US 8,300,812 B2
(45) Date of Patent: Oct. 30, 2012

(54) METHODS OF SCRAMBLING AND DESCRAMBLING UNITS OF DATA

(75) Inventor: Antonius Johannes Petrus Maria Van De Ven, Schiedam (NL)

(73) Assignee: Irdeto Access B.V. (NL)

( * ) Notice: Subject to any disclaimer, the term of this patent is extended or adjusted under 35 U.S.C. 154(b) by 1510 days.

(21) Appl. No.: 11/592,788

(22) Filed: Nov. 2, 2006

(65) Prior Publication Data

US 2008/0025509 A1 Jan. 31, 2008

(30) Foreign Application Priority Data

Nov. 8, 2005 (EP) .................................. 05110495

(51) Int. Cl.
*H04L 29/06* (2006.01)
(52) U.S. Cl. ........................................... 380/37; 380/42
(58) Field of Classification Search .................... 380/37, 380/42
See application file for complete search history.

(56) References Cited

U.S. PATENT DOCUMENTS

| | | | |
|---|---|---|---|
| 5,799,089 A | * | 8/1998 | Kuhn et al. ....................... 380/37 |
| 6,055,316 A | * | 4/2000 | Perlman et al. ................. 380/262 |
| 2003/0072445 A1 | * | 4/2003 | Kuhlman et al. ............... 380/42 |

FOREIGN PATENT DOCUMENTS

WO WO-9510906 4/1995

OTHER PUBLICATIONS

Schneier, Bruce—Applied Cryptography, Published by John Wiley & Son, Inc. 1996 p. 195.*
"Digital Video Broadcasting (DVB); Implementation Guidelines of the DVB Simulcrypt Standard, ETSI Technical Report TR 102 035 v.1.1.1", *ETSI TR* 102 035 V1.1.1 (Apr. 2002),1-35.
"Search Report for Application No. 05 11 0495", (May 2, 2006),4 pgs.

* cited by examiner

*Primary Examiner* — Kaveh Abrishamkar
*Assistant Examiner* — Ngoc D Nguyen
(74) *Attorney, Agent, or Firm* — Schwegman Lundberg & Woessner, P.A.

(57) ABSTRACT

A method of scrambling a stream of data includes obtaining from the stream a succession of first sequences of blocks of data. The order of the blocks is reversed in each of the first sequences of blocks to form respective second sequences of blocks of data. The blocks in each second sequence of blocks are encrypted using a cipher in block chaining mode, initialized with a respective initialization vector for each second sequence of blocks. For a succession of first sequences of blocks included in a unit of data within the stream, at least one initialization vector for encrypting a second sequence of blocks formed from a first sequence of blocks in the unit is generated in dependence on at least one block in a preceding first sequence of blocks of the unit.

17 Claims, 5 Drawing Sheets

METHODS OF SCRAMBLING AND DESCRAMBLING UNITS OF DATA

CLAIM OF PRIORITY

The present patent application claims the priority benefit of the filing date of European Application (EPO) No. 05110495.8 filed Nov. 8, 2005, the entire content of which is incorporated herein by reference.

BACKGROUND

Certain methods and systems of scrambling a stream of data are known from WO 95/10906. In the known method, the digital data is divided into packets of N blocks, X(1), X(2), ... X(N), wherein each block has $2^m$ bits. The sequence of blocks is reversed before the encryption operation into X(N), X(N−1), ... , X(1). This sequence of blocks is encrypted by the encryption algorithm E in the following manner (where ^ is used to denote an exclusive OR (XOR) operator):

$Y(1)=E[X(N)\char`\^IV]$ $Y(i)=E[X(N-i+1)\char`\^Y(i-1)]$ for $i>1$ and $i \leq N$.

The sequence of these encrypted blocks is again reversed, so that the sequence Y(N), Y(N−1), ... Y(1) is transferred to the receiver.

At the receiver side, the original data blocks are obtained by means of the decryption algorithm D as follows:

$X(i)=D[Y(N-i+1)\char`\^Y(N-i)]$ for $i=1, 2, ... , N-1$ $X(N)=D[Y(1)]\char`\^IV$.

The method used in the known system is indicated as reverse cipher block chaining or RCBC method. It shows the advantage that a buffer storage at the receiver is required for storing two data blocks only.

One example problem of the known method and system is that it requires a buffer at the sender side with the capacity for storing N blocks, in order to implement the reversal of the sequence of blocks. This becomes a problem where there are many senders of encrypted data in a system for data communication, or where a device has to function as both a sender and receiver of data.

SUMMARY

According to one aspect of the example embodiments a method of scrambling a stream of data is provided, wherein, for a succession of first sequences of blocks included in a unit of data within the stream, at least one initialisation vector for encrypting a second sequence of blocks formed from a first sequence of blocks in the unit is generated in dependence on at least one block in a preceding first sequence of blocks of the unit.

Because the unit of data includes a succession of first sequences of blocks, each first sequence of blocks is formed of fewer blocks, meaning that less buffer storage is required to reverse the order of blocks. This is possible with an acceptable level of security because at least two of the second sequences of blocks are in effect chained. This chaining is due to the fact that at least one initialisation vector—each except the first one in case maximum security is required—for encrypting a second sequence of blocks formed from a first sequence of blocks is generated in dependence on at least one block in a preceding first sequence of blocks of the unit.

In an embodiment, respective initialisation vectors for encrypting the blocks in each second sequence of blocks formed from a first sequence of blocks are generated in dependence on at least one block of data preceding a last block in the same first sequence.

This has the effect that a larger variation in initialisation vectors is achieved. Even the blocks of a first of the first sequences of blocks in the succession included in a unit are scrambled using an initialisation vector with a high probability of being unique. Variation is assured by generating the initialisation vector in dependence on at least one block of data preceding a last block in the same first sequence. Because of the reversal of the order of the blocks in each first sequence, the one or more blocks of data in dependence on which the initialisation vector is generated becomes available during descrambling before the initialisation vector is required by the descrambler. Thus, uniqueness of the initialisation vector for each first sequence in the succession of first sequences included in the unit is achievable with a relatively high probability without having to provide the receiver with a new initialisation vector for each first sequence.

In an embodiment, each initialisation vector for encrypting a second sequence of blocks formed from a first sequence of blocks in the unit is generated in dependence on at least one block in each of any preceding first sequences of blocks of the unit.

Thus, the chaining between the second sequences is maximised, in that the last first sequence of blocks of data cannot be obtained in the clear without previously having obtained all of any preceding first sequences of blocks in the succession of first sequences included in the unit.

An embodiment includes receiving a data packet comprising a header and a payload, wherein the unit is formed by the payload.

This embodiment is advantageous because the payload can be scrambled without having to buffer it in its entirety first.

In an embodiment, the cipher is a block cipher configured to operate on basic blocks of a pre-determined size, wherein the blocks in at least the second sequences of data correspond in size to the basic block size.

In an embodiment, if the unit is constituted by the succession of first sequences of blocks and a succeeding amount of data equal in size to less than a multiple of the size of the basic block, the amount of data is padded to a size equal to a multiple of the size of a basic block to form a first end sequence of at least two blocks, the last two blocks of the first end sequence of blocks are exchanged and the order of the blocks in the first end sequence of blocks is reversed to form a second end sequence of blocks of data, the blocks in the second end sequence of blocks are encrypted using the cipher in block chaining mode, initialised by an initialisation vector generated in dependence on at least one block in a preceding first sequence of blocks of the unit.

Thus, the method is adapted to implement a form of ciphertext stealing. This is a relatively secure way of ensuring that the entire unit is scrambled. In addition, it allows the use of first sequences formed from a pre-determined number of blocks to scramble a first section of the unit.

In an embodiment, if a next unit in the stream is constituted by zero or more first sequences of a pre-determined number of blocks and by an amount of data equal in size to less than the size of one basic block, the amount of data is padded to a size equal to the size of one basic block to form a final block, the final block is encrypted using the cipher in block chaining mode, initialised by an initialisation vector generated in dependence on at least one block in a preceding first sequence of locks of the unit.

Thus, the succeeding amount of data need not be transmitted in the clear, even though it is smaller than the basic block size for which the cipher is configured.

In a variant of this embodiment, the initialisation vector is generated by performing a cryptographical operation, preferably a decryption that is an inverse of the cipher, on a vector based on at least one vector that is independent of any block in any preceding first sequence of blocks of the unit.

The effect is that a variation in the initialisation vector can be achieved using the same vector as used to generate an initialisation vector for scrambling blocks of data in a preceding unit. Thus, fewer vectors need be transmitted to the descrambler, whilst security remains relatively good. Using a decryption that is an inverse of the cipher has the effect that use is made of the hardware and/or software configuration of the descrambler that is already present for decryption purposes.

According to another aspect of the example embodiments the system for scrambling a stream of data is arranged, for a succession of first sequences of blocks included in a unit of data within the stream, to generate at least one initialisation vector for encrypting a second sequence of blocks formed from a first sequence of blocks in the unit in dependence on at least one block in a preceding first sequence of blocks of the unit.

Due to its efficiency, the system is very suited to being included in a dedicated encryption processor.

In one example embodiment, the system is configured to execute a method according to the example embodiments.

According to another aspect of the example embodiments the method of descrambling a stream of scrambled data is arranged, for a succession of sequences of blocks of scrambled data included in a unit of data within the stream of scrambled data, at least one initialisation vector for descrambling a sequence of blocks of scrambled data is generated in dependence on at least one block of descrambled data in a sequence of blocks of descrambled data obtained by descrambling a preceding sequence of blocks of scrambled data of the unit.

The method is suitable for descrambling a stream of scrambled data obtainable by applying a method of scrambling a stream of data according to the example embodiments. Because the sequences of blocks of data in a succession are descrambled separately and in order, it does not matter so much if the blocks within a sequence are received out of order (e.g. in reverse order), since the sequences are shorter than the entire succession of sequences. Because at least one initialisation vector for descrambling a sequence of blocks of scrambled data is generated in dependence on at least one block of descrambled data in a sequence of blocks of descrambled data obtained by descrambling a preceding sequence of blocks of scrambled data of the unit, at least two sequences of blocks of scrambled data are chained, making illicit descrambling harder.

In an embodiment, respective initialisation vectors for descrambling each sequence of blocks of scrambled data are generated in dependence on at least one block of data obtained by applying the decryption cipher to a block in the sequence of blocks of scrambled data preceding the final block of scrambled data in the same sequence and by applying an operator having as operands at least the result of the decryption cipher and a block of scrambled data at a next position in the same sequence of blocks of scrambled data.

This has the advantage that a stream of many units does not require transmission of many initialisation vectors from the scrambler to the descrambler in order to achieve sufficient variety in the initialisation vectors.

In an embodiment, each initialisation vector for descrambling a sequence of blocks of scrambled data in the unit is generated in dependence on at least one block of descrambled data from each of any sequence of blocks of descrambled data obtained by descrambling a preceding sequence of blocks of scrambled data in the unit.

Thus, in effect, all sequences in the succession included in the unit are chained.

An embodiment includes receiving a data packet comprising a header and a payload, wherein the unit is formed by the payload.

In an embodiment, the decryption cipher is a block cipher configured to operate on basic blocks of a predetermined size, wherein the blocks in the sequences of blocks of scrambled data correspond in size to the basic block size.

In an embodiment, if the unit is constituted by the succession of sequences of blocks of scrambled data and a succeeding amount of data equal in size to an integer multiple of the basic block size and a fraction of the basic block size, the amount of data is padded with pre-determined data to a size equal to a multiple of the basic block size to form an end sequence of blocks of scrambled data, a final one of an end sequence of blocks of descrambled data is formed by applying the decryption cipher to a block immediately preceding a final block of the end sequence of scrambled data, applying an XOR-operator having as operands the result of the decryption cipher and the final block of the end sequence of blocks of scrambled data, and removing a part of the result of the XOR-operator corresponding in size to the pre-determined data, each of any blocks preceding the final two blocks of the end sequence of blocks of descrambled data is formed by applying the decryption cipher to a block at a corresponding position in the first end sequence of blocks of scrambled data and applying an XOR-operator having as operands the result of the decryption cipher and a block of descrambled data at a next position in the end sequence of blocks of scrambled data, and a block preceding the final block in the end sequence of blocks of descrambled data is obtained by applying the decryption cipher to a block formed by concatenating the removed part corresponding in size to the pre-determined data and the final block of the end sequence of blocks of scrambled data, and by applying an XOR-operator having as operands the result of the decryption cipher and an initialisation vector generated in dependence on at least one block of descrambled data obtained by descrambling a preceding sequence of blocks of scrambled data in the unit.

This is an implementation of ciphertext stealing at the descrambler-side.

In an embodiment, if a next unit is constituted by zero or more sequences of a pre-determined number of blocks and by a succeeding amount of data equal in size to less than the size of one basic block, the amount of data is padded to a size equal to the size of one basic block to form a final block, the final block is decrypted using the cipher in block chaining mode, initialised by an initialisation vector generated in dependence on at least one block in at least one of any sequences of blocks of descrambled data obtained by descrambling a preceding sequence of blocks of scrambled data in the unit.

Using sequences of a pre-determined number of blocks has the effect that the number of blocks per sequence need not be communicated to the descrambler. Where the boundaries of the unit are also pre-determined, for example in case the unit is formed by the payload of a packet, any remaining amount of data that is smaller in size than the basic block size of the cipher can still be sent to the descrambler in encrypted form. It is not necessary to increase the size of the scrambled unit compared to the unscrambled unit.

In a variant, the initialisation vector is generated by performing a cryptographical operation, preferably the decryption cipher, on a vector based on at least one vector that is independent of any block in any preceding block of descrambled data obtainable by descrambling a preceding sequence of blocks of scrambled data in the unit.

This means that the descrambler need not receive and store many vectors from which to derive initialisation vectors. The vector from which the initialisation vectors are derived can remain constant over a number of units of data in the stream. The cryptographical operation ensures that it is never used directly as an operand for a logical operator, such as an exclusive OR operator.

According to another aspect of the example embodiments, the system for descrambling a stream of scrambled data to form a stream of data according to is configured, for a succession of sequences of blocks of scrambled data included in a unit of data within the stream of scrambled data, to generate at least one initialisation vector for descrambling a sequence of blocks of scrambled data in dependence on at least one block of descrambled data in a sequence of blocks of descrambled data obtained by descrambling a preceding sequence of blocks of scrambled data of the unit.

In one example embodiment, the system is configured to carry out a method of descrambling according to the example embodiments.

According to another aspect of the example embodiments, there is provided an apparatus for sending and receiving data, including a device arranged to apply a method of scrambling a stream of data according to the example embodiments and a method of descrambling a stream of scrambled data according to the example embodiments.

Because the complimentary methods of scrambling and descrambling can be implemented with equal buffer requirements, this apparatus need not have registers for storing blocks that are unused in one of the two operations. Thus, an economical implementation in hardware is possible, especially suitable for a device that is arranged to function as both a sender and receiver of data, for example a gateway between two networks.

According to another aspect of the example embodiments, there is provided a computer program including a set of instructions capable, when incorporated in a machine readable medium, of causing a system having information processing capabilities to perform a method of scrambling a stream of data according to the example embodiments or a method of descrambling a stream of scrambled data according to the example embodiments.

BRIEF DESCRIPTION OF THE DRAWINGS

Aspects of the example embodiments will now be explained in further detail with reference to the accompanying drawings, in which.

DETAILED DESCRIPTION

Example embodiments relate to a method of scrambling a stream of data, including obtaining from the stream a succession of first sequences of blocks of data, reversing the order of the blocks in each of the first sequences of blocks to form respective second sequences of blocks of data, and encrypting the blocks in each second sequence of blocks using a cipher in block chaining mode, initialised with a respective initialisation vector for each second sequence of blocks.

The example embodiments also relates to a system for scrambling a stream of data, including an input for receiving the stream as a succession of first sequences of blocks of data, a plurality of registers and at least one logic unit for reversing the order of the blocks in each of the first sequences of blocks to form respective second sequences of blocks of data, and a processing arrangement for encrypting the blocks in each second sequence of blocks using a cipher in block chaining mode, initialised with a respective initialisation vector for each second sequence of blocks.

The example embodiments also relate to a method of descrambling a stream of scrambled data to form a stream of data, including obtaining from the stream of scrambled data a succession of sequences of blocks of scrambled data, and descrambling each sequence of blocks of scrambled data to form an associated sequence of blocks of descrambled data, by using a decryption cipher in reverse chaining mode, wherein, to descramble a sequence of blocks of scrambled data, a final block in the sequence of blocks of descrambled data is obtained by applying the decryption cipher to a final block in the associated sequence of blocks of scrambled data and applying an operator having as operands at least the result of the decryption cipher and an initialisation vector, and wherein each block preceding the final block in the sequence of blocks of descrambled data is obtained by applying the decryption cipher to a block in the sequence of blocks of scrambled data at a corresponding position and applying an operator having as operands at least the result of the decryption cipher and a block of scrambled data at a next position in the sequence of blocks of scrambled data.

The example embodiments also relate to a system for descrambling a stream of scrambled data to form a stream of data, including an input for receiving the stream of scrambled data as a succession of sequences of blocks of scrambled data, and a processing arrangement for descrambling each sequence of blocks of scrambled data to form an associated sequence of blocks of descrambled data, by using a decryption cipher in reverse chaining mode, wherein, to descramble a sequence of blocks of scrambled data, a final block of descrambled data in the sequence is obtained by applying the decryption cipher to a final block in the associated sequence of blocks of scrambled data and applying an operator having as operands at least the result of the decryption cipher and an initialisation vector, and wherein each preceding block of descrambled data in the sequence is obtained by applying the decryption cipher to a block in the sequence of blocks of scrambled data at a corresponding position and applying an operator having as operands at least the result of the decryption cipher and a block of descrambled data at a next position in the sequence of blocks of scrambled data.

The example embodiments also relates to an apparatus for sending and receiving data.

The example embodiments also relates to a computer program.

Figure 1:
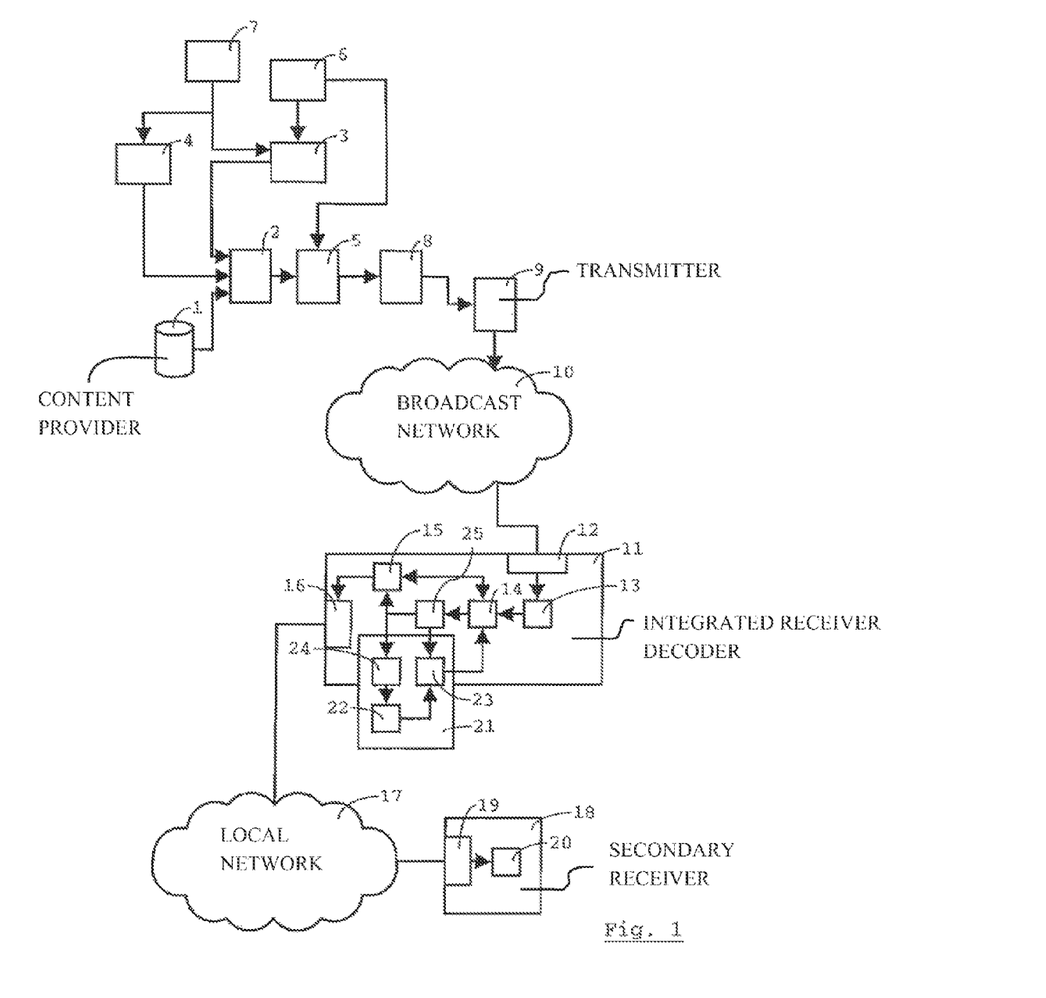
FIG. 1 illustrates a system for implementing methods of scrambling and descrambling streams of broadcast data.

FIG. 1 illustrates the application of a scrambling method to broadcast data. At least part of the illustrated system uses techniques known per se from "Digital Video Broadcasting (DVB); Implementation Guidelines of the DVB Simulcrypt Standard", ETSI Technical Report TR 102 035 v.1.1.1, European Telecommunication Standards Institute, 2002.

A content provider 1 provides a stream of packets carrying plaintext, i.e. unscrambled, content data, to a multiplexing unit 2. An Entitlement Control Message (ECM) generator 3 provides the multiplexing unit 2 with a stream of packets carrying ECMs. An Entitlement Management Message (EMM) generator 4 provides the multiplexing unit 2 with a stream of packets carrying EMMs. The streams are multiplexed to a single stream of MPEG-2 Transport Stream (TS) packets, and provided to a scrambler 5. The syntax of MPEG-2 TS packets is described more fully in international standard ISO/IEC 13818-1. The scrambler 5 implements a method of scrambling the payloads of the MPEG-2 TS packets that will be described in more detail below. It receives Control Words (CWs) from a CW generator 6, which are used as keys for a block cipher.

The CW generator 6 provides the CWs to the ECM generator 3, which encrypts them under a session key obtained from a Subscriber Authorisation System (SAS) 7. The SAS provides session keys with authorisations for individual subscribers to the EMM generator 4. The EMM generator includes these keys and authorisation information in EMMs addressed to secure tokens provided to individual subscribers. Such secure tokens may include software agents implemented using features such as code obfuscation for preventing analysis of the routines contained in them. Other examples of secure tokens include devices including processors provided with protective features to prevent access to data stored in them and/or analysis of routines hard-wired into them.

The scrambled stream of data is passed from the scrambler 5 to a modulator 8, and from there to a transmitter 9. The transmitter 9 broadcasts the stream of scrambled data over a broadcast network 10, for example a satellite, cable or terrestrial network, or a network comprising a number of such networks. In an alternative embodiment, the stream of scrambled MPEG-2 TS packets is encapsulated in further data packets, and broadcast, multicast or unicast over a data network, such as one based in the Internet Protocol.

For illustrative purposes, one primary Integrated Receiver Decoder (IRD) 11 is shown in FIG. 1. The primary IRD 11 includes a network adapter 12 for receiving data transmitted over the broadcast network 10. A demodulator 13 makes the stream of scrambled data available to a scrambler/descrambler 14. The latter unit is configured for carrying out both a method of descrambling a stream of data and a method of scrambling a stream of data. A processor 15 controls the operation of the primary IRD 11. It can direct a stream of scrambled data generated by the scrambler/descrambler 14 to a second network adapter 16 connecting the primary IRD 11 to a local network 17. The local network 17 may be a home network, for example based on the IEEE 1394 standard. A secondary receiver 18 is provided with a corresponding network adapter 19 and a descrambler chip 20. Further components are not shown in detail. The descrambler chip 20 operates in the same manner as the scrambler/descrambler 14. For this reason, it will not be described in further detail.

Returning to the scrambler/descrambler 14, this component will descramble scrambled. MPEG-2 TS packets using CWs provided by a Conditional Access Sub-System (CASS) 21. The CASS 21 connects to a secure processing device 22, for example a smart card, which provides the keys for decrypting ECMs to a first decryptor 23. The first decryptor 23 obtains the CWs passed to the scrambler/descrambler 14. EMMs are decrypted by a second decryptor 24, to provide the secure processing device 22 with the information necessary for it to obtain the service keys. The processor directs a demultiplexing unit 25 to retrieve the MPEG-2 TS packets carrying the ECMs and those carrying the EMMs in order to provide them to the CASS 21.

Figure 2:
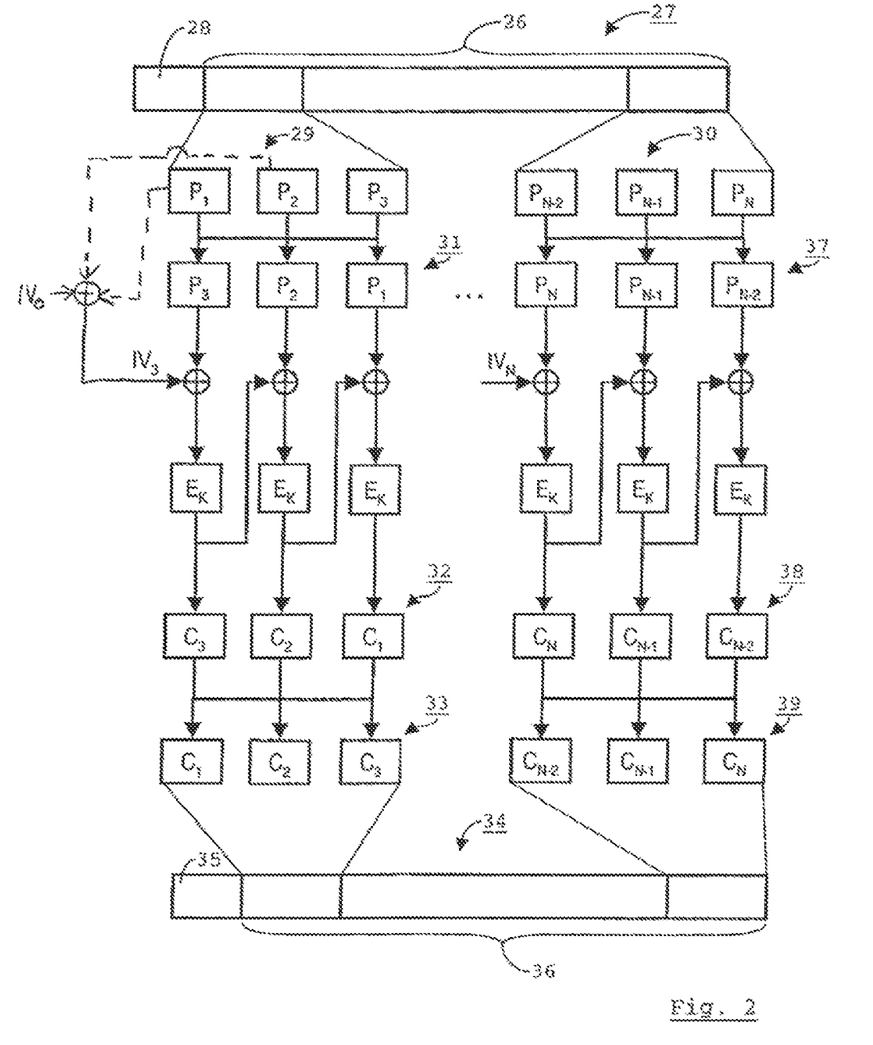
FIG. 2 illustrates an embodiment of a method of scrambling a stream of data.

FIG. 2 illustrates an embodiment of a method of scrambling a stream of data such as carried out by the scrambler 5 and/or scrambler/descrambler 14. In the illustrated embodiment, the method is carried out on a unit of data formed by a payload 26 of an MPEG-2 TS packet 27, which further comprises a header 28. The header 28 is not scrambled, but left in the clear. It is observed that the method may be carried out on other types of packets, not necessarily defined by a transport layer network protocol. For example, the method may also be carried out on Program Elementary Stream (PES) packets carried within MPEG-2 TS Packets 27.

Although the MPEG-2 TS packet 27 is of a fixed length, 188 bytes, the payload 26 is not. This is due to the varying length of the header 28. In the example illustrated in FIG. 2, the payload 26 is of such a size that it can be divided into an integer number of basic blocks $P_i$ of a fixed size, and equally into an integer number of so-called super-blocks. Each super-block is formed by a first sequence of basic blocks $P_i$. A first first sequence 29 and a last first sequence 30 are illustrated explicitly. A succession of super-blocks constitutes the payload 26. In the example, each super-block is formed by a first sequence 29,30 of three basic blocks $P_i$. In another embodiment, there are two basic blocks $P_i$ per super-block. There may be more than three, for example, four, five or ten basic blocks per super-block. A larger number requires more registers in the scrambler 5 and/or scrambler/descrambler 14.

The steps taken where the payload 26 is not of a size equal to an integer number of super-blocks formed by an integer number of basic blocks $P_i$ will be dealt with further below.

In another variant of the method (not illustrated), the payload 26 is divided into super-blocks of varying size, i.e. containing a varying number of basic blocks $P_i$.

The basic block size is preferably determined by a block cipher $E_k$, a symmetric key cipher which operates on fixed-length groups of bits, the basic blocks, with an unvarying transformation. In the illustrated embodiment, the block cipher $E_k$ is used to encrypt individual basic blocks $P_i$ under a CW. Examples of suitable ciphers include DES, triple DES and AES/Rijndael. Thus, the basic block size will generally be 128 bits.

In a first step of the method, the order of the basic blocks $P_1$-$P_3$ in the first first sequences 29 is reversed to form a first second sequence 31.

In a second step, the block cipher $E_k$ is used in cipher block chaining mode to encrypt the three basic blocks $P_1$-$P_3$ in the first second sequence 31, which is initialised with an initialisation vector $IV_3$ associated with the first second sequence. The index used to refer to the initialisation vector $IV_3$ associated with the first second sequence 31 of basic blocks is that of the last basic block $P_3$ in the sequence, as will be the case throughout the present text. The initialisation vector $IV_3$ used to encrypt the associated first second sequence 31 of basic blocks is formed by application of an exclusive OR operator having as operands a long-term fixed initialisation vector $IV_0$ and the exclusive OR of both basic blocks $P_1$,$P_2$ preceding the last basic block $P_3$ in the first first sequence 29 of basic blocks $P_1$-$P_3$.

The method of scrambling the payloads 26 is configured such that the long-term fixed initialisation vector $IV_0$ is never used directly as an initialisation vector. It is never used in an XOR-operation immediately preceding the operation of the block cipher $E_k$ on a first basic block $P_i$ in a second (i.e. reversed) sequence of blocks. For this reason, it can be used over multiple MPEG-2 TS packets 27 without making cryptanalysis substantially easier. The long-term fixed initialisation vector $IV_0$ need not be kept secret. It will be known when the methods for scrambling and descrambling units of data outlined herein are used in peer-to-peer communications. In the situation illustrated in FIG. 1, where a single provider controls senders and receivers, the long-term fixed initialisation vector $IV_0$ can be kept secret. It can be provided in an ECM or EMM, for example. In an alternative embodiment, a vector from which to derive initialisation vectors that is independent of the blocks of data to be scrambled is obtained by applying a pre-determined algorithm on data included in the header 28.

Because the initialisation vector $IV_3$ used for encrypting the blocks $P_1$-$P_3$ in the associated first second sequence 31 of blocks is generated in dependence on at least one block of data preceding the last block $P_3$ in the first first sequence 29 from which it was obtained, more variation in the initialisation vectors is achieved.

The result of the encryption of the first second sequence 31 is a first first sequence 32 of scrambled blocks $C_3$-$C_1$. In the illustrated embodiment, the order of scrambled blocks $C_3$-$C_1$ is reversed to form a first second sequence 33 of scrambled blocks $C_1$-$C_3$. The first second sequence 33 of scrambled blocks $C_1$-$C_3$ is inserted into a scrambled MPEG-2 TS packet 34, comprising an unencrypted header 35 and a scrambled payload 36.

Thus, for the first first sequence 29 of basic blocks $P_i$, i=1 . . . M, the encrypted basic blocks $C_i$ are obtained as follows:

$$C_M = E_k[P_M\hat{\,}IV_M]$$

$$C_i = E_k[P_i\hat{\,}C_{i+1}], i=M-1 \ldots 1.$$

In general, the encrypted basic blocks are found as follows:

$$C^*_{j^*M} = E_k[P^*_{j^*M}\hat{\,}IV^*_{j^*M}],$$

$$C_{(j-1)^*M+i} = E_k[P_{(j-1)^*M+i}\hat{\,}C_{(j-1)^*M+i+1}], i=M-1 \ldots 1,\ j=1 \ldots N\backslash M.$$

The symbol "\" refers to the quotient or integer part of a ratio.

In the illustrated embodiment, the initialisation vector $IV_{j^*M}$ for encrypting the blocks in the j-th second sequence is obtained as follows:

$$IV_{j^*M} = IV_0\hat{\,}P_1\hat{\,}\ldots P_i\hat{\,}P_{j^*M-1}.$$

Thus, the respective initialisation vectors for encrypting the blocks in each second sequence of blocks formed from a first sequence of blocks by reversing the order of the blocks are generated in dependence on at least one block of data preceding a last block in that same first sequence. In this embodiment, they are generated in dependence on all blocks of data preceding a last block in that same first sequence.

Not only that, each initialisation vector for encrypting a second sequence of locks formed from a first sequence of blocks in the packet payload 26 is generated in dependence on at least one block, in this case all blocks, in each of any preceding first sequences of basic blocks, or "super-blocks".

To encrypt the blocks $P_{N-2}$-$P_N$ in a last second sequence 37, obtained by reversing the order of basic blocks in the last first sequence 30 of basic blocks, the encryption cipher $E_k$ is again operated in cipher block chaining mode. An initialisation vector $IN_N$ associated with the last second sequence 37 of basic blocks is generated by performing the XOR-operation on the long-term fixed initialisation vector $IV_0$ and each of the basic blocks preceding a last basic block $P_N$. The result is a last first sequence 38 of blocks of scrambled data. The order of the blocks is reversed to obtain a last second sequence 39 of blocks of scrambled data.

Figure 3:
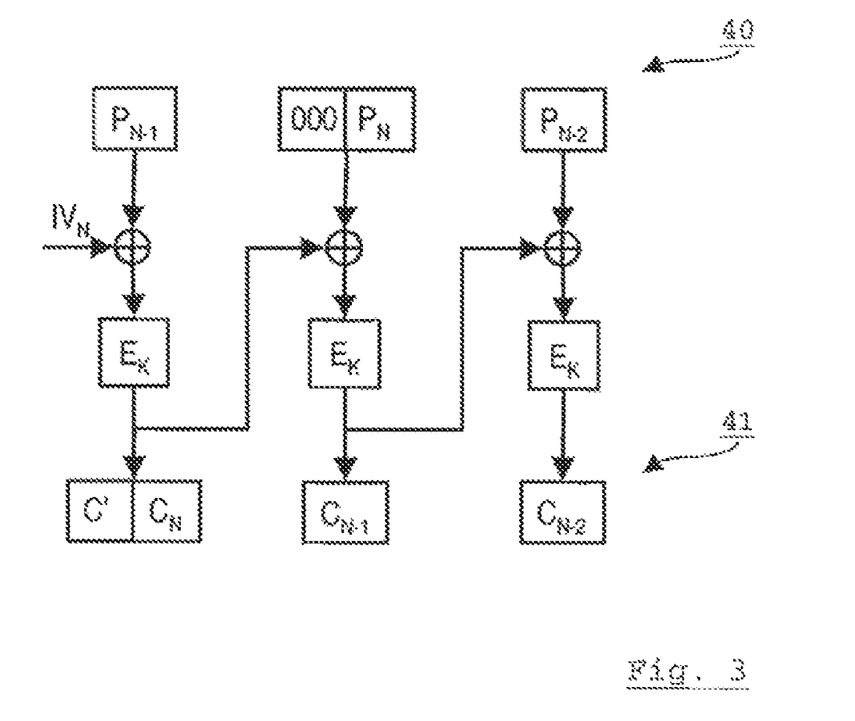
FIG. 3 illustrates a method of implementing ciphertext stealing in a method of scrambling a stream of data.

FIG. 3 illustrates how the scrambling method proceeds if the MPEG-2 TS packet payload 26 is constituted by an integer number of N\M first sequences of basic blocks and a succeeding amount of data equal in size to less than M basic blocks. In the illustrated embodiments, the succeeding amount of data can be divided into two complete basic blocks $P_{N-2}$, $P_{N-1}$ and one partial block $P_N$. The last block $P_N$ is padded with zeroes to a size equal to a complete basic block. Thus, a first end sequence is formed by the blocks $P_{N-2}$, $P_{N-1}$ and the padded N-th block $P_N$. The positions of the last two blocks of the first end sequence of blocks are exchanged to form a second end sequence 40 of blocks (shown in FIG. 3). The blocks in the second end sequence 40 of blocks are encrypted using the encryption cipher $E_k$ in block chaining mode. As initialisation vector $IV_N$, an initialisation vector is generated by applying an XOR-operation having as operands the long-term fixed initialisation vector $IV_0$ and each of the complete basic blocks preceding the last complete block $P_{N-1}$ preceding the partial block $P_N$ in the MPEG-2 TS packet payload 26. The result is a first end sequence 41 of blocks of scrambled data. An amount of scrambled data C' corresponding in size and position to the data added by padding is removed from the first block in the first end sequence 41 of blocks, and the order of blocks is subsequently reversed to obtain a second end sequence of scrambled blocks (not shown), which is inserted into the scrambled payload 36. Of course, the scrambled data C' could be removed subsequent to reversing the order of the blocks.

Figure 4:
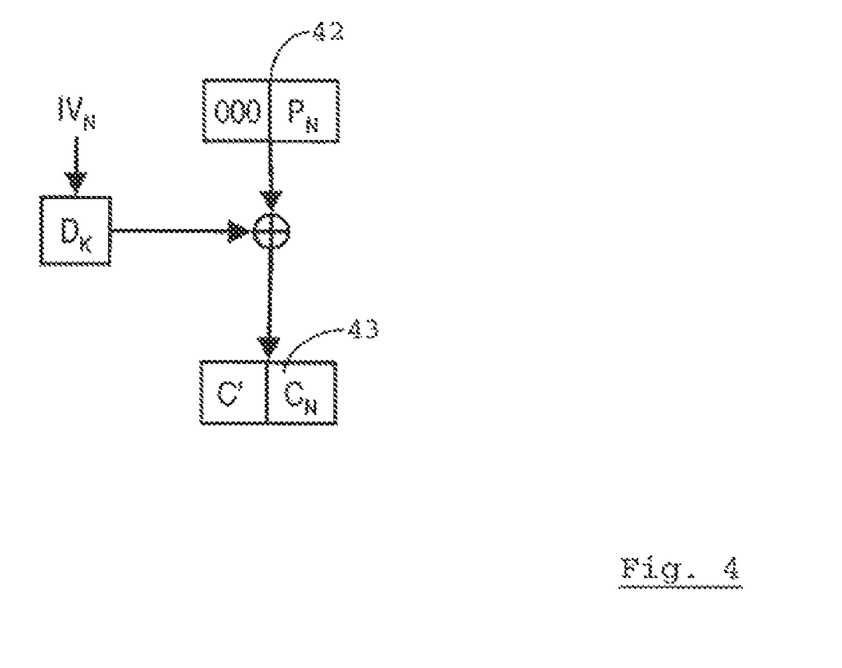
FIG. 4 illustrates how single partial blocks forming the end of an MPEG-2 Transport Stream packet payload are handled.

If the MPEG-2 TS packet payload 26 is constituted by an integer number of N\M first sequences of basic blocks and a succeeding amount of data equal in size to less than one basic block, the operation depicted in FIG. 4 is carried out. A partial block $P_N$ is padded with zeroes to a full-sized final block 42. An initialisation vector $IN_N$ is generated in dependence on the long-term fixed initialisation vector $IV_0$ and at least one block in any preceding first sequence of blocks of the packet payload 26. It may occur that there are no preceding first sequences. So as not to use the long-term fixed initialisation vector $IV_0$ directly as an operand in an XOR-operation, initialisation vector $IV_N$ associated with the full-sized final block 39 is decrypted first, using a decryption cipher that is the inverse of the encryption cipher $E_K$ and the CW as a key.

The exclusive OR of the result and the full-sized final block 42 is obtained, and encrypted by applying the block cipher $E_K$. The result is a full-sized scrambled block 43, which is truncated by removing a part corresponding in size and position to the data added by padding the partial block $P_N$. The remaining part $C_N$ is inserted into the scrambled payload 36.

The payloads of a succession of MPEG-2 TS packets 27 are scrambled in this way, thus forming a scrambled stream of data. The ciphertext stealing and the method of handling single partial blocks ensure that the scrambled payload 36 is equal in size to the payload 26 of the original plaintext MPEG-2 TS packet 27. Thus, the header 35 of the scrambled MPEG-2 TS packet 34 need not be altered substantially relative to that of the plaintext MPEG-2 TS packet 27, except to indicate that it has been scrambled and, optionally, which of an odd and even CW have been used for the block cipher $E_K$.

Figure 5:
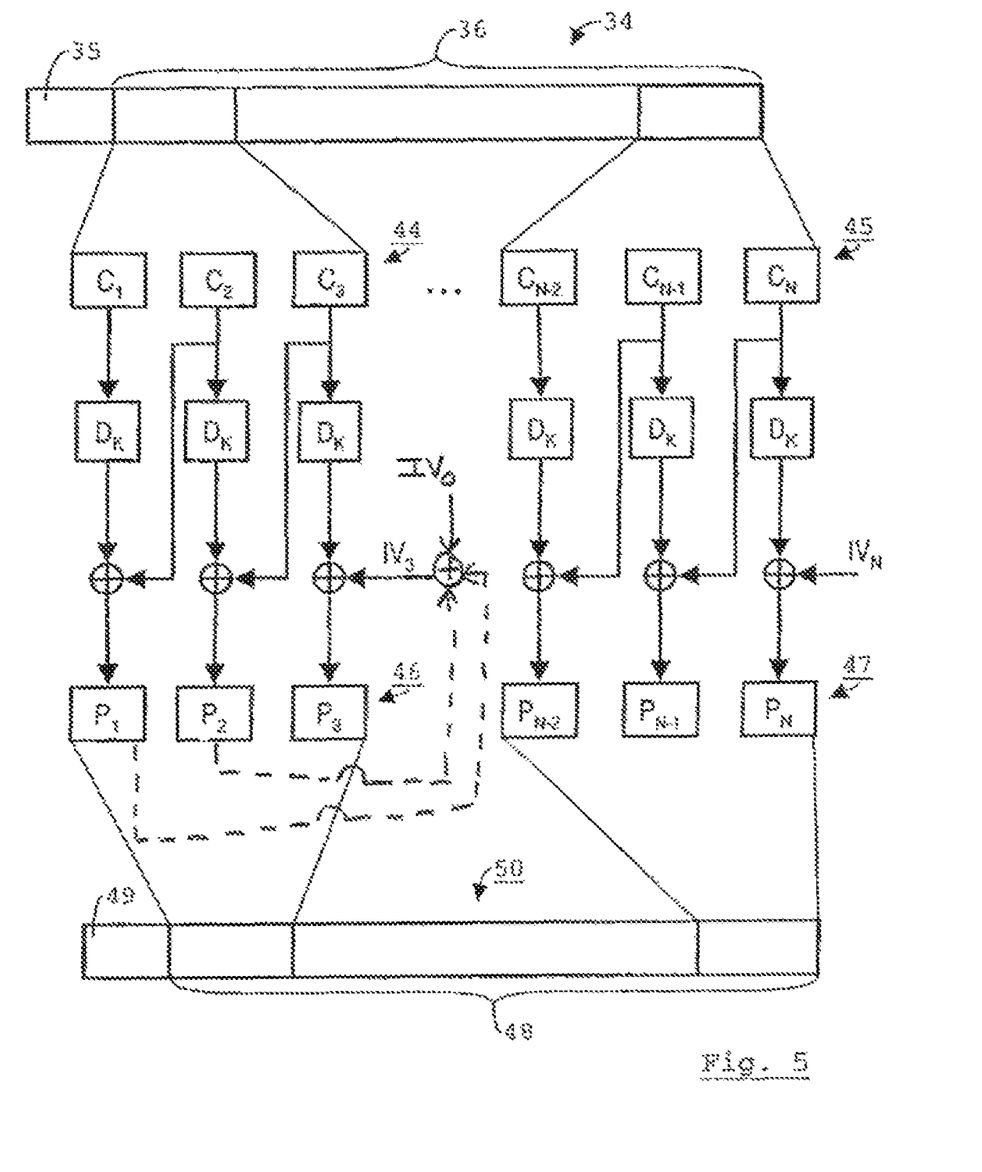
FIG. 5 illustrates an embodiment of a method of descrambling a stream of data.

FIG. 5 illustrates the descrambling operation corresponding to the scrambling operation illustrated in FIG. 2. As was the case for FIG. 2, FIG. 5 is based on the assumption that there are exactly N\M "super-blocks" in the scrambled payload 36. The scrambled payload 36 forms a succession of sequences of blocks $C_i$ of scrambled data, each sequence corresponding to a "super-block". A first sequence 44 of blocks $C_1$-$C_3$ of scrambled data and a last sequence 45 of blocks $C_{N-2}$-$C_N$ are shown.

Each sequence of blocks of scrambled data is descrambled separately to form an associated sequence of blocks of descrambled data. Thus, the first sequence 44 of blocks $C_1$-$C_3$ is descrambled to form a first sequence 46 of plaintext blocks $P_1$-$P_3$. The last sequence 45 of blocks $C_{N-2}$-$C_N$ is descrambled to form a last sequence 47 of plaintext blocks $P_{N-2}$-$P_N$. The sequences of plaintext blocks are used to form a plaintext MPEG-2 TS packet payload 48, preceded by a header 49, and thus to form a re-constituted plaintext MPEG-2 TS packet 50.

A first block $P_1$ of descrambled data in the first sequence 46 of plaintext blocks is obtained by applying a decryption cipher $D_K$ that is the inverse of the encryption cipher $E_K$ to a first block $C_1$ of scrambled data and applying an XOR-operator having as operands the result of the decryption cipher $D_K$ and a next scrambled block $C_2$ in the sequence 44 of blocks of scrambled data. A second block $P_2$ is obtained in the same way. The CW obtained from an ECM is used as the key for the decryption cipher $D_K$.

A final block $P_3$ of descrambled data in the first sequence 46 of plaintext blocks is obtained by applying the decryption cipher $D_K$ to a final block $C_3$ in the first sequence 44 of blocks $C_1$-$C_3$ of scrambled data. The result is XOR-ed with an initialisation vector $IV_3$ associated with the first "super-block". This initialisation vector $IV_3$ is generated in dependence on at least one block of data obtained by applying the decryption cipher $D_K$ to a block in the first sequence 44 of blocks of scrambled data preceding the final block $C_3$ of scrambled data in the same sequence and by applying an operator, the XOR-operator, having as operands at least the result of the decryption cipher $D_K$ and block of descrambled data at a next position in the sequence of blocks of scrambled data. In the illustrated embodiment, the initialisation vector $IV_3$ is the XOR of the fixed long-term initialisation vector $IV_0$ and all blocks in the first sequence 46 of plaintext blocks preceding the final plaintext block $P_3$. Since these preceding plaintext blocks are obtained before the final plaintext block $P_3$ is to be obtained, the descrambling method is relatively efficient.

In general, in an embodiment using a fixed number M of blocks of scrambled data for each of a succession of sequences of blocks of scrambled data included in the scrambled payload 35, the plaintext blocks are found as follows:

$$P_{j\ M}^{*}=D_k[P_{j\ M}^{*}\ IV_{j\ M}^{*}],$$

$$P_{(j-1)\ M+i}^{*}=C_{(j-1)\ M+i+1}^{*} \char`\^ D_k[C_{(j-1)\ M+i}^{*}], i=M-1\ldots 1,$$
$$j=1\ldots N\backslash M.$$

In the illustrated embodiment, the initialisation vector $IV_{j\ M}^{*}$ for decrypting the blocks in the j-th sequence is obtained as follows:

$$IV_{j\cdot M}=IV_0\char`\^ P_1\char`\^\ldots P_i\char`\^ P_{j\cdot M-1}.$$

In this manner, the initialisation vector used to descramble the second and further sequences of blocks of scrambled data are generated in dependence on at least one block of descrambled data in a sequence of blocks of descrambled data obtained by descrambling a preceding sequence of blocks of descrambled data in the scrambled payload 36.

Figure 6:
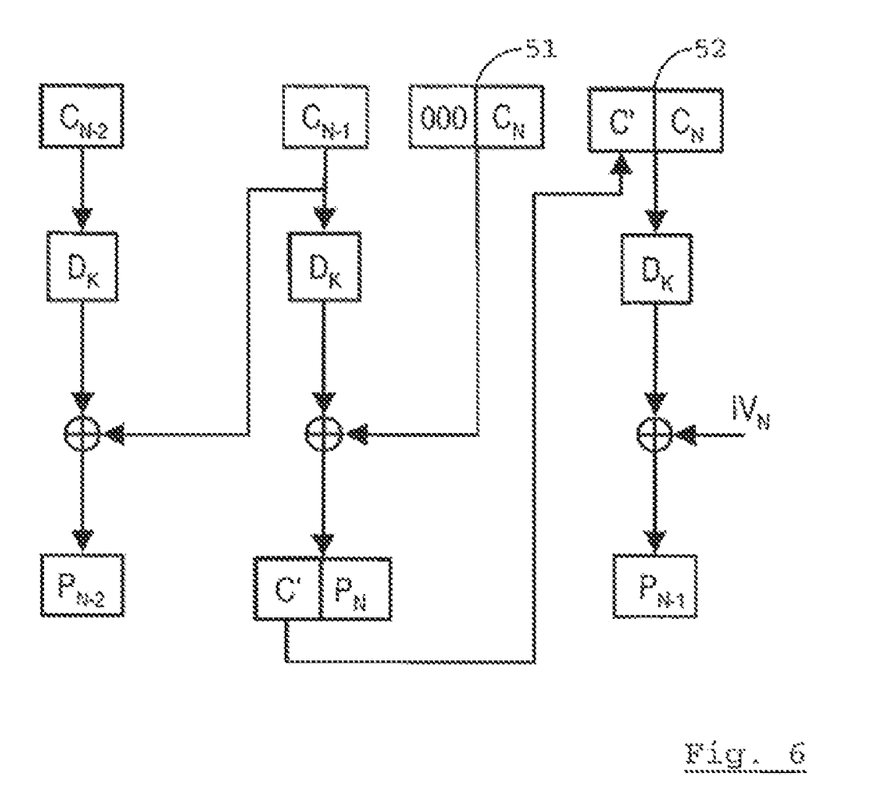
FIG. 6 illustrates an implementation of ciphertext stealing in a descrambler.

FIG. 6 illustrates how the scrambling method proceeds if the scrambled payload 36 is constituted by an integer number of N\M first sequences of basic blocks and a succeeding amount of data equal in size to an integer multiple of the basic block size and a fraction of the basic block size. In the illustrated embodiment, the succeeding amount of data can be divided into two complete scrambled blocks $C_{N-2}$, $C_{N-1}$ and one partial block $C_N$. The last block $C_N$ is padded with zeroes to a size equal to a last complete basic block 51. Thus, an end sequence is formed by the blocks $C_{N-2}$, $C_{N-1}$ and the last complete basic block 51. A final plaintext block $P_N$ is formed by applying the decryption cipher $D_K$ to the block $C_{N-1}$ immediately preceding the final block of the end sequence of blocks of scrambled data, applying an XOR-operator to the result of the decryption cipher and the last complete basic block 51 and removing a part C' of the result of the XOR-operator corresponding in size and position to the data added by padding the last scrambled block $C_N$. Each of any blocks preceding the final two plaintext blocks $P_{N-1}$, $P_N$—in this case, the first block $P_{N-2}$ of the sequence is the only such block—is formed by applying the decryption cipher $D_K$ to a block at a corresponding position in the end sequence of blocks of scrambled data and applying an XOR-operator to the result of the decryption cipher $D_K$ and a block of scrambled data at a next position in the end sequence of blocks of scrambled data.

The block $P_{N-1}$ preceding the last block in the end sequence of plaintext blocks is obtained by applying the decryption cipher to a block 52 formed by concatenating the last scrambled block $C_N$ and the removed part C' corresponding in size and position to the zeroes used for padding, and then applying an XOR-operator having as operands the result of the decryption cipher $D_K$ and an initialisation vector $IV_N$. As initialisation vector $IV_N$, an initialisation vector is generated by applying an XOR-operation having as operands the long-term fixed initialisation vector $IV_0$ and each of the last two blocks $P_{N-1}$, $P_N$ in the plaintext MPEG-2 TS packet payload 48.

Figure 7:
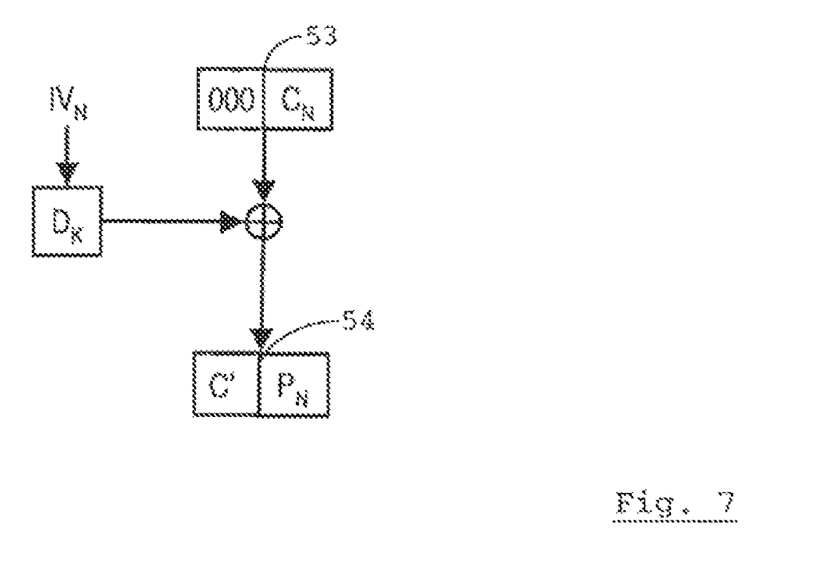
FIG. 7 illustrates how single partial blocks forming the end of an MPEG-2 Transport Stream packet payload are handled in a descrambler.

If the scrambled payload 36 is constituted by an integer number of N\M sequences of scrambled blocks and a succeeding amount of data equal in size to less than one basic block, the operation depicted in FIG. 7 is carried out. A partial scrambled block $C_N$ is padded with zeroes to a full-sized final scrambled block 53. An initialisation vector $IN_N$ is generated in dependence on the long-term fixed initialisation vector $IV_0$ and at least one block in any preceding sequence of scrambled blocks in the scrambled payload 36. It may occur that there are no preceding sequences of scrambled blocks. So as not to use the long-term fixed initialisation vector $IV_0$ directly as an operand in an XOR-operation, the initialisation vector $IN_N$ associated with the full-sized final scrambled block 53 is decrypted first, using the same decryption cipher $D_K$ as used in block chaining mode, with the CW used as a key. The exclusive OR of the result and the full-sized final scrambled block 50 is obtained. The result is a full-sized block 54, which is truncated by removing a part C' corresponding in size and position to the data added by padding the partial scrambled block $C_N$. The remaining part $P_N$ is inserted into the plaintext MPEG-2 TS packet payload.

Thus, a method has been described in detail in which the "super-blocks" are of a pre-determined size, but that can cope with packet payloads of varying sizes including those that are not an integer multiple of the chosen size of the "super-block". The initialisation vector for each "super-block" is never used directly as a mask for an XOR-operator. It depends as much as possible on preceding plaintext blocks in the packet payload, so that as much variation in the initialisation vector is obtained as is possible. Memory requirements for storing the results of operations are substantially the same for the scrambler and descrambler and can be kept as low as is considered acceptable for security reasons by choosing a lower size of "super-block".

The invention is not limited to the described embodiments, which may be varied within the scope of the accompanying claims. In particular, an embodiment is possible in which the first sequence of scrambled blocks is not converted to a second sequence of scrambled blocks by reversing the order of blocks in the scrambler, but where the reversal is carried out in the descrambler prior to carrying out the method of descrambling a stream of scrambled data illustrated herein.

What is claimed is:

1. A method of scrambling a stream of data, comprising:
receiving at a scrambler the stream of data;
obtaining from the stream of data a succession of first sequences of blocks of data,
reversing the order of the blocks in each of the first sequences of blocks to form respective second sequences of blocks of data, and
encrypting the blocks in each second sequence of blocks using a cipher in block chaining mode, initialised with a respective initialisation vector for each second sequence of blocks,
wherein, for a succession of first sequences of blocks included in a unit of data within the stream, at least one first initialisation vector for encrypting a second sequence of blocks formed from a first sequence of blocks in the unit is generated in dependence on at least one block in a preceding first sequence of blocks of the unit.

2. A method according to claim 1, wherein for each second sequence of blocks formed from a first sequence of blocks, said respective initialisation vector is generated in dependence on at least one block of data preceding a last block in the same first sequence of blocks.

3. A method according to claim 1, wherein said at least one first initialisation vector for encrypting a second sequence of blocks formed from a first sequence of blocks in the unit is generated in dependence on at least one block in each of any preceding first sequences of blocks of the unit.

4. A method according to claim 1, including receiving a data packet comprising a header and a payload, wherein the unit is formed by the payload.

5. A method according to claim 1, wherein the cipher is a block cipher configured to operate on basic blocks of a pre-determined size, wherein the blocks in at least the second sequences of data correspond in size to the basic block size.

6. A method according to claim 5, wherein, if the unit is constituted by the succession of first sequences of blocks and a succeeding amount of data equal in size to less than a multiple of the size of the basic block,
the amount of data is padded to a size equal to a multiple of the size of a basic block to form a first end sequence of at least two blocks,
the last two blocks of the first end sequence of blocks are exchanged and the order of the blocks in the first end sequence of blocks is reversed to form a second end sequence of blocks of data,
the blocks in the second end sequence of blocks are encrypted using the cipher in block chaining mode, initialised by an initialisation vector generated in dependence on at least one block in a preceding first sequence of blocks of the unit.

7. A method according to claim 5, wherein, if the unit is constituted by zero or more first sequences of a pre-determined number of blocks and by an amount of data equal in size to less than the size of one basic block,
the amount of data is padded to a size equal to the size of one basic block to form a final block,
the final block is encrypted using the cipher in block chaining mode, initialised by an initialisation vector generated in dependence on at least one block in at least one of any preceding first sequences of blocks of the unit.

8. A system for scrambling a stream of data, comprising:
an input for receiving the stream as a succession of first sequences of blocks of data,
a plurality of registers and at least one logic unit for reversing the order of the blocks in each of the first sequences of blocks to form respective second sequences of blocks of data, and
a processing arrangement for encrypting the blocks in each second sequence of blocks using a cipher in block chaining mode, initialised with a respective initialisation vector for each second sequence of blocks,
wherein, the system is arranged, for a succession of first sequences of blocks included in a unit of data within the stream, to generate at least one first initialisation vector for encrypting a second sequence of blocks formed from a first sequence of blocks in the unit in dependence on at least one block in a preceding first sequence of blocks of the unit.

9. A method of descrambling a stream of scrambled data to form a stream of data, comprising:
receiving at a descrambler a stream of scrambled data;
obtaining from the stream of scrambled data a succession of sequences of blocks of scrambled data, and
descrambling each sequence of blocks of scrambled data to form an associated sequence of blocks of descrambled data, by using a decryption cipher in reverse chaining mode, wherein, to descramble a sequence of blocks of scrambled data,
a final block in the sequence of blocks of descrambled data is obtained by applying the decryption cipher to a final block in the associated sequence of blocks of scrambled data and applying an operator having as operands at least the result of the decryption cipher and an initialisation vector, and wherein each block preceding the final block in the sequence of blocks of descrambled data is obtained by applying the decryption cipher to a block in the sequence of blocks of scrambled data at a corresponding position and applying an operator having as operands at least the result of the decryption cipher and a block of scrambled data at a next position in the sequence of blocks of scrambled data,
wherein, for a succession of sequences of blocks of scrambled data included in a unit of data within the stream of scrambled data, at least one first initialisation vector for descrambling a sequence of blocks of scrambled data is generated in dependence on at least one block of descrambled data in a sequence of blocks of descrambled data obtained by descrambling a preceding sequence of blocks of scrambled data of the unit.

10. A method according to claim 9, wherein for each sequence of blocks of scrambled data, said respective initialisation vector is generated in dependence on at least one block of descrambled data obtained by applying the decryption cipher to a block in the sequence of blocks of scrambled data preceding the final block of scrambled data in the same sequence and by applying an operator having as operands at least the result of the decryption cipher and a block of scrambled data at a next position in the same sequence of blocks of scrambled data.

11. A method according to claim 9, wherein said at least one first initialisation vector for descrambling a sequence of blocks of scrambled data is generated in dependence on at least one block of descrambled data from each of any sequence of blocks of descrambled data obtained by descrambling a preceding sequence of blocks of scrambled data in the unit.

12. A method according to claim 9, including receiving a data packet comprising a header and a payload, wherein the unit is formed by the payload.

13. A method according to claim 9, wherein the decryption cipher is a block cipher configured to operate on basic blocks of a predetermined size, wherein the blocks in the sequences of blocks of scrambled data correspond in size to the basic block size.

14. A method according to claim 13, wherein, if the unit is constituted by the succession of sequences of blocks of scrambled data and a succeeding amount of data equal in size to an integer multiple of the basic block size and a fraction of the basic block size,
the amount of data is padded with pre-determined data to a size equal to a multiple of the basic block size to form an end sequence of blocks of scrambled data,
a final one of an end sequence of blocks of descrambled data is formed by applying the decryption cipher to a block immediately preceding a final block of the end sequence of scrambled data, applying an XOR-operator having as operands the result of the decryption cipher and the final block of the end sequence of blocks of scrambled data, and removing a part of the result of the XOR-operator corresponding in size to the pre-determined data,
each of any blocks preceding the final two blocks of the end sequence of blocks of descrambled data is formed by applying the decryption cipher to a block at a corresponding position in the first end sequence of blocks of scrambled data and applying an XOR-operator having as operands the result of the decryption cipher and a block of scrambled data at a next position in the end sequence of blocks of scrambled data, and
a block preceding the final block in the end sequence of blocks of descrambled data is obtained by applying the decryption cipher to a block formed by concatenating the removed part corresponding in size to the pre-determined data and the final block of the end sequence of blocks of scrambled data, and by applying an XOR-operator having as operands the result of the decryption cipher and an initialisation vector generated in dependence on at least one block in at least one of any sequences of blocks of descrambled data obtained by descrambling a preceding sequence of blocks of scrambled data in the unit.

15. A method according to claim 13, wherein, if a next unit is constituted by zero or more sequences of a pre-determined number of blocks and by a succeeding amount of data equal in size to less than the size of one basic block,
the amount of data is padded to a size equal to the size of one basic block to form a final block,
the final block is decrypted using the cipher in block chaining mode, initialised by an initialisation vector generated in dependence on at least one block in at least one of any sequences of blocks of descrambled data obtained by descrambling a preceding sequence of blocks of scrambled data in the unit.

16. A system for descrambling a stream of scrambled data to form a stream of data, comprising:
an input for receiving the stream of scrambled data as a succession of sequences of blocks of scrambled data, and
a processing arrangement for descrambling each sequence of blocks of scrambled data to form an associated sequence of blocks of descrambled data, by using a decryption cipher in reverse chaining mode, wherein, to descramble a sequence of blocks of scrambled data,
a final block of descrambled data in the sequence is obtained by applying the decryption cipher to a final block in the associated sequence of blocks of scrambled data and applying an operator having as operands at least the result of the decryption cipher and an initialisation vector, and wherein each preceding block of descrambled data in the sequence is obtained by applying the decryption cipher to a block in the sequence of blocks of scrambled data at a corresponding position and applying an operator having as operands at least the result of the decryption cipher and a block of scrambled data at a next position in the sequence of blocks of scrambled data,
wherein the system is configured, for a succession of sequences of blocks of scrambled data included in a unit of data within the stream of scrambled data, to generate at least one first initialisation vector for descrambling a sequence of blocks of scrambled data in dependence on at least one block of descrambled data in a sequence of blocks of descrambled data obtained by descrambling a preceding sequence of blocks of scrambled data of the unit.

17. A computer program stored on a non-transitory computer readable medium, the computer program including a set of instructions that when executed on a processor, are capable of causing a system having information processing capabilities to perform a method of scrambling a stream of data, the method comprising:
obtaining from the stream of data a succession of first sequences of blocks of data,
reversing the order of the blocks in each of the first sequences of blocks to form respective second sequences of blocks of data, and
encrypting the blocks in each second sequence of blocks using a cipher in block chaining mode, initialised with a respective initialisation vector for each second sequence of blocks,
wherein, for a succession of first sequences of blocks included in a unit of data within the stream, at least one first initialisation vector for encrypting a second sequence of blocks formed from a first sequence of blocks in the unit is generated in dependence on at least one block in a preceding first sequence of blocks of the unit.

* * * * *